United States Patent Office

3,173,913
Patented Mar. 16, 1965

3,173,913
11-(AMINOALKYL)-5,6-DIHYDRO-11-HYDROXY-DIBENZ[b-e]-AZEPIN-6-ONE DERIVATIVES
Cornelis van der Stelt, Haarlem, Netherlands, assignor to N.V. Koninklijke Pharmaceutische Fabrieken v/h Brocades Stheeman & Pharmacia, Amsterdam, Netherlands, a corporation of Dutch law
No Drawing. Filed May 17, 1962, Ser. No. 195,436
Claims priority, application Great Britain, June 7, 1961, 20,638/61
7 Claims. (Cl. 260—239.3)

This invention relates to new basically substituted dihydrodibenzazepinones and their salts having valuable therapeutic properties, processes for the preparation thereof and new intermediates useful in such processes.

The therapeutically active compounds of this invention include dihydrodibenzazepinones of the general Formula I:

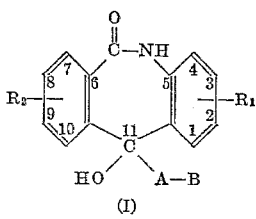

(I)

wherein A is a lower alkylene radical of at least two carbon atoms, B is a saturated nitrogen-containing radical of less than twelve carbon atoms, and $R_1$ and $R_2$ are the same or different and represent hydrogen, halogen and lower alkyl; and salts thereof.

Among the suitable radicals represented by the symbol B are: amino; (lower alkyl) amino; di(lower alkyl) amino; and basic saturated 5 to 6 member N-heterocyclic radicals of less than twelve carbon atoms, as exemplified by piperidyl (i.e., piperidino, 2-piperidyl, 3-piperidyl and 4-piperidyl); (lower alkyl) piperidyl; di(lower alkyl) piperidyl and tri(lower alkyl) piperidyl; pyrrolidyl; morpholinyl; thiamorpholinyl; piperazyl; lower alkyl piperazyl (e.g. $N^4$-methyl piperazino) and (hydroxy lower alkyl) piperazyl.

The terms "lower alkyl" and "lower alkylene" as employed herein, include both straight and branched chain radicals of less than eight carbon atoms. The particularly preferred compounds are those wherein A is a lower alkylene radical of two to three carbon atoms (i.e., ethylene, trimethylene-1,3 and propylene-1,2); B represents a di(lower alkyl) amino radical, a piperidino radical or a morpholino radical, $R_1$ is in the 2-position and represents hydrogen, chloro or methyl and $R_2$ is hydrogen.

As to the salts of the dihydrodibenzazepinones, those coming within the purview of this invention include the acid-addition salts, particularly the non-toxic acid-addition salts. Acids useful for preparing the acid-addition salts include, inter alia, inorganic acids, such as the hydrohalic acids (e.g., hydrochloric and hydrobromic acid), sulfuric acid and phosphoric acid, and organic acids such as oxalic, maleic, fumaric, tartaric, citric, acetic and succinic acid.

The compounds of this invention are therapeutically active compounds which are utilizable as psychotropic agents, antiallergics, anticholinergics and analgetics. They may be administered orally or parenterally in conventional dosage forms such as tablets, capsules, injectables or the like by incorporating the appropriate dose of the compound with carriers according to accepted pharmaceutical practice.

The compounds of this invention can be prepared by one of the processes of this invention employing as the starting material an anthraquinone of the general Formula II:

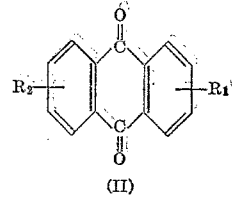

(II)

wherein $R_1$ and $R_2$ are as hereinbefore defined. In those instances where the starting keto compound is new, it can be prepared by interacting a phthalic anhydride with benzene, a halobenzene or lower alkylbenzene to yield an ortho benzoyl benzoic acid which in turn is cyclized under the influence of water-binding substances such as phosphorus pentoxide or sulfuric acid. This series of reactions is shown by the following equations, wherein $R_1$ and $R_2$ are as hereinbefore defined:

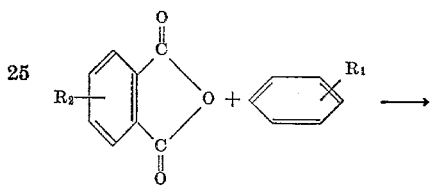

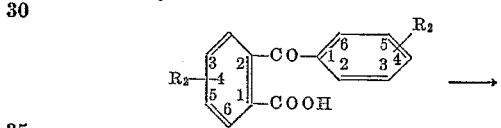

If a substituted phthalic anhydride is used as a reactant in the above series of reactions the position of the substituent on the resulting anthraquinone will depend on the position of the substituent on the phthalic anhydride. Thus, where an ortho substituted phthalic anhydride is condensed with a substituted benzene, a mixture of 3- and 6-substituted 2-benzoylbenzoic acids is obtained. These products are then separated by fractional crystallization and the separated products treated with phosphorus pentoxide or sulfuric acid, to yield the following substituted anthraquinones:

From 3-$R_2$-2-(2'-$R_1$-benzoyl)benzoic acid: 1-$R_1$, 8-$R_2$-anthraquinone
From 6-$R_2$-2-(2'-$R_1$-benzoyl)benzoic acid: 1-$R_1$, 5-$R_2$-anthraquinone
From 3-$R_2$-2-(3'-$R_1$-benzoyl)benzoic acid: 1-$R_1$, 7-$R_2$-anthraquinone and 1-$R_1$, 5-$R_2$-anthraquinone
From 6-$R_2$-2-(3'-$R_1$-benzoyl)benzoic acid: 1-$R_1$, 6-$R_2$-anthraquinone and 1-$R_1$, 8-$R_2$-anthraquinone
From 3-$R_2$-2-(4'-$R_1$-benzoyl)benzoic acid: 1-$R_1$, 6-$R_2$-anthraquinone
From 6-$R_2$-2-(4'-$R_1$-benzoyl)benzoic acid: 1-$R_1$, 7-$R_2$-anthraquinone Where a meta substituted phthalic anhydride is used, a mixture of 4- and 5-substituted 2-benzoylbenzoic acids is obtained. These products are then separated by fractional crystallization and then treated so as to effect cyclization. As cyclizing agents compounds as phosphorus pentoxide or sulfuric acid may again be used. There are obtained the following anthraquinones:

From 4-$R_2$-2-(2'-$R_1$-benzoyl)benzoic acid: 1-$R_1$, 7-$R_2$-anthraquinone

From 5-$R_2$-2-(2'-$R_1$-benzoyl)benzoic acid: 1-$R_1$, 6-$R_2$-anthraquinone

From 4-$R_2$-2-(3'-$R_1$-benzoyl)benzoic acid: 1-$R_1$, 6-$R_2$-anthraquinone and 2-$R_1$, 7-$R_2$-anthraquinone From 5-$R_2$-2-(3'-$R_1$-benzoyl)benzoic acid: 2-$R_1$, 6-$R_2$-anthraquinone and 1-$R_1$, 7-$R_2$-anthraquinone From 4-$R_2$-2-(4'-$R_1$-benzoyl)benzoic acid: 2-$R_1$, 6-$R_2$-anthraquinone From 5-$R_2$-2-(4'-$R_1$-benzoyl)benzoic acid: 2-$R_1$, 7-$R_2$-anthraquinone It is equally possible to prepare the substituted anthraquinones without isolation of the intermediate benzoyl benzoic acids.

Among the suitable phthalic anhydrides utilizable as initial reagents in these reactions may be mentioned: phthalic anhydride; halo-phthalic anhydrides, such as 3- and 4-chlorophthalic anhydride, and 3- and 4-bromophthalic anhydride; and (lower alkyl)phthalic anhydrides, such as 3- and 4-methylphthalic anhydrides, 3- and 4-ethylphthalic anhydride 3- and 4-isopropylphthalic anhydride and 3- and 4-tertiary butyl phthalic anhydride.

Among the suitable substituted benzenes utilizable as initial reagents in these reactions may be mentioned: benzene; halobenzenes, such as chlorobenzene and bromobenzene; (lower alkyl)-benzenes, such as toluene, ethylbenzene, isopropylbenzene and tertiary butyl benzene.

To prepare the compounds of this invention, the anthraquinone is first converted into an morphanthridinedione (compounds III), which are new compounds of this invention insofar as at least one of the symbols $R_1$ and $R_2$ does not represent hydrogen, by treatment with sodium azide in a sulfuric acid solution and the resulting dione is then interacted with a basically substituted alkylmagnesium halide (preferably chloride) of the formula B—A—Mg-halide.

To prepare the acid-addition salts, the resulting base is treated with the desired acid in the usual manner.

This series of reactions is shown by the following equations, wherein $R_1$, $R_2$, A and B are as hereinbefore defined:

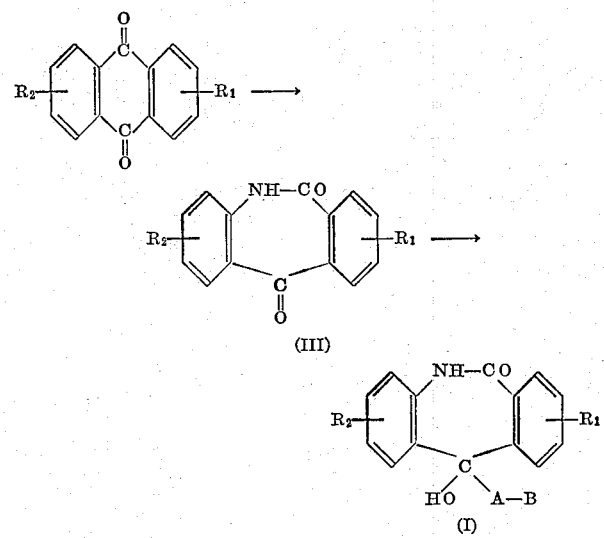

If a substituted anthraquinone is used as a reactant in the above series of reactions the position of the substituent on the resulting morphanthridinedione and therefore on the final product will depend on the results of the reaction with sodium azide, four morphanthridine derivatives being feasible leading to four different dihydrodibenzazepinones. Thus, where a 1-substituted anthraquinone is used as the starting material a mixture of 1-, 4-, 7- and 10-substituted morphanthridinediones is obtained yielding similarly substituted dihydrodibenzazepinones upon treatment with a suitable Grignard reagent. Similarly, a 2-substituted anthraquinone yields a mixture of 2-, 3-, 8- and 9-substituted morphanthridinediones from which the correspondingly substituted dihydrodibenzazepinones can be prepared. Separation of the four isomeric products can be effected in either stage of the preparation of the compounds of the invention. It is usually preferred to defer separation until the easily crystallizable acid-addition salts of the desired end products are prepared.

The following examples illustrate the invention (all temperatures being in centigrade). The first four examples are directed to the preparation of the intermediate compounds III and the remaining examples are directed to the preparation of the final compounds of this invention.

EXAMPLE 1

6,11-[5H]morphanthridinedione

To 500 cc. of concentrated sulfuric acid is added 100 g. of anthraquinone. To the constantly cooled solution 100 g. of sodium azide is added within a period of about 40 minutes with stirring. The reaction mixture is stirred for another two hours at room temperature. The mixture is poured into 2½ liters of ice water. The solid morphanthridinedione is removed by filtration and washed with water until the filtrate reacts negatively when examined for sulfate ions. The solid reaction product is dried and then recrystallized from 1400 cc. of glacial acetic acid. The yellowishly colored precipitate is filtered off, washed with ether and dried over potassium hydroxide at about 60° under reduced pressure to yield 69 g. (64.7%) of product melting at about 246.5–249°.

EXAMPLE 2

1-, 4-, 7- and 10-methyl-6,11-[5H]morphanthridinedione

Following the procedure of Example 1, but substituting an equivalent amount of 1-methylanthraquinone for the anthraquinone, there is obtained a mixture of 1-, 4-, 7- and 10-methyl-6,11-[5H]morphanthridinedione.

EXAMPLE 3

2-, 3-, 8- and 9-chloro-6,11-[5H]morphanthridinedione

Following the procedure of Example 1, but substituting an equivalent amount of 2-chloroanthraquinone for the anthraquinone, there is obtained a mixture of 2-, 3-, 8- and 9-chloro-6,11-[5H]morphanthridinedione.

EXAMPLE 4

3-Methyl-7-chloro; 2-methyl-10-chloro; 8-methyl-3-chloro and 9-methyl-1-chloro-6,11-[5H]morphanthridinedione Following the procedure of Example 1, but substituting an equivalent amount of 1-chloro-7-methylanthraquinone for the anthraquinone, there is obtained a mixture of:

3-methyl-7-chloro-6,11-[5H]morphanthridinedione,
2-methyl-10-chloro-6,11-[5H]morphanthridinedione,
3-chloro-8-methyl-6,11-[5H]morphanthridinedione, and
1-chloro-9-methyl-6,11-[5H]morphanthridinedione.

EXAMPLE 5

11-(γ-diethylaminopropyl)-5,6-dihydro-11-hydroxy-11H-dibenz[b,e]-azepin-6-one

To 6 g. of magnesium turnings in 25 cc. of tetrahydrofuran is added 1 cc. of ethylbromide and a small crystal of iodine. When the reaction has started, 38 g. of γ-diethylaminopropylchloride in 65 cc. of tetrahydrofuran is added in 10 minutes under vigorous stirring and external cooling. The mixture is refluxed for another 10 minutes and then heated on a water bath for about 15 minutes. To this mixture is added a suspension of 28 g. of 6,11-[5H]morphanthridinedione in 200 cc. of tetrahydrofuran. The addition is completed in 1½ hours. The reaction mixture is boiled under reflux overnight. To the red-brown colored solution 1 liter of benzene is added. The magnesium complex is decomposed with 800 cc. of water to which ammonium chloride is added. The organic layer is separated and washed six times with water to remove the tetrahydrofuran. The mixture is concentrated under reduced pressure without previous drying. The yellow residue is dissolved in acetone and the solution is filtered. To the filtrate is added a solution of malonic acid in ether. The temperature rises and soon a crystalline solid precipitates. The non-converted morphanthridinedione does not react with malonic acid. Further amounts of ether are added until no further precipitation occurs. The acetone-ether layer is decanted. The residual oil which solidifies on standing is dissolved in warm ethanol. Upon addition of ether a yellow precipitate is formed. The solid amine salt is separated and treated with 750 cc. of benzene. A solution of 50 g. of potassium carbonate in 400 cc. of water is then added. The free amine formed dissolves in the benzene layer. The organic layer is washed twice with water, dried over anhydrous potassium carbonate and concentrated under reduced pressure.

The residue is crystallized from equal amounts of acetone and petroleum ether (boiling range 28–40°) to yield 12 g. (29%) of product melting at about 145–148°. The melting point can be raised to 148.5–149.5° by crystallization from acetone.

*Analysis.*—Calculated for $C_{21}H_{26}O_2N_2$: C, 74.52%; H, 7.74%; N, 8.28%. Found: C, 74.59%; H, 7.64%; N, 8.44%.

Similarly, by substituting an equivalent amount of the following substituted 6,11-[5H]morphanthridinediones for the 6,11-[5H]morphanthridinedione used in Example 5, and following the procedure of Example 5, the indicated bases are formed:

| Substituted 6,11-[5H] Morphan-thridinedione | Product |
|---|---|
| 1-chloro | 1-chloro |
| 2-chloro | 2-chloro |
| 1-methyl | 1-methyl |
| 2-methyl | 2-methyl |
| 4-methyl | 4-methyl |
| 2-bromo | 2-bromo |
| 2-ethyl | 2-ethyl |
| 3-isopropyl | 3-isopropyl |
| 8-methyl | 8-methyl |
| 9-tertiary butyl | 9-tertiary butyl |
| 9-chloro | 9-chloro |

EXAMPLE 6

*11-(β-dimethylaminoethyl)-5,6-dihydro-11-hydroxy-11H-dibenzo[b,e]-azepin-6-one, salt with hydrochloric acid*

(a) Following the procedure of Example 5 but substituting an equivalent amount of β-dimethylaminoethylmagnesium chloride for the γ-diethylaminopropylmagnesium chloride, 11-(β-dimethylaminoethyl)-5,6-dihydro-11-hydroxy-11H-dibenzo[b,e]azepin-6-one is formed.

(b) The hydrochloric acid salt of this compound is obtained by dissolving 3.4 g. of the free amine in ether and adding thereto an ethereal solution of 3.6 g. of hydrochloric acid. The solid is filtered and can be recrystallized if necessary from a mixture of ethanol and ether.

EXAMPLE 7

*11-[N-(β-piperidinoethyl)]-5,6-dihydro-11-hydroxy-11H-dibenzo[b,e]azepin-6-one, salt with citric acid*

Following the procedure of Example 5 but substituting an equivalent amount of N-(β-piperidino)ethyl magnesium chloride for the γ-diethylaminopropyl magnesium chloride and following the procedure of Example 6b for the preparation of an acid-addition salt but substituting an equivalent amount of citric acid for the hydrochloric acid, 11-[N-(β-piperidinoethyl)]-5,6-dihydro-11-hydroxy-11H-dibenzo[b,e]azepin-6-one, salt with citric acid is formed.

EXAMPLE 8

*11-[N-(γ-morpholinopropyl)]-5,6-dihydro-11-hydroxy-11H-dibenzo[b,e]azepin-6-one, salt with oxalic acid*

Following the procedure of Example 5 but substituting an equivalent amount of N-(γ-morpholino)propyl magnesium chloride for the γ-diethylaminopropyl magnesium chloride and following the procedure of Example 6b for the preparation of an acid-addition salt but substituting an equivalent amount of oxalic acid for the hydrochloric acid, 11-[N-(γ-morpholinopropyl)]-5,6-dihydro - 11-hydroxy-11H-dibenzo[b,e]azepin-6-one, salt with oxalic acid is formed.

The invention includes within its scope pharmaceutical preparations comprising one or more of the therapeutically active compounds of the invention in association with a pharmacologically acceptable carrier.

What is claimed is:

1. A compound selected from the group consisting of bases of the formula

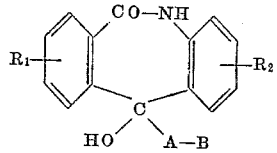

wherein A is lower alkylene of at least two carbon atoms, B is a member of the group consisting of amino, (lower alkyl)amino, di(lower alkyl)amino, piperidyl, (lower alkyl)piperidyl, di(lower alkyl)piperidyl, tri(lower alkyl) piperidyl, pyrrolidyl, morpholinyl, thiamorpholinyl, piperazyl, (lower alkyl)piperazyl, and (hydroxy lower alkyl) piperazyl, and $R_1$ and $R_2$ are each selected from the group consisting of hydrogen, halogen and lower alkyl; and non-toxic acid-addition salts thereof.

2. A compound of the formula

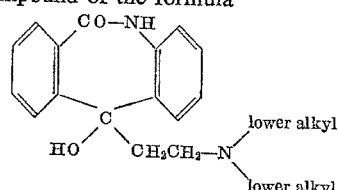

3. A compound of the formula

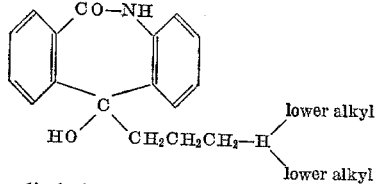

4. 11-(γ-diethylaminopropyl) - 5,6 - dihydro-11-hydroxy-11H-dibenzo[b,e]azepin-6-one.

5. A non-toxic acid addition salt of the compound of claim 3.

6. A non-toxic acid-addition salt of 11-(β-dimethylaminoethyl)-5,6-dihydro-11-hydroxy - 11H - dibenzo[b,e] azepin-6-one.

7. A non-toxic acid-addition salt of 11-[N-(β-piperidinoethyl)]5,6-dihydro-11-hydroxy - 11H - dibenzo[b,e] azepin-6-one.

References Cited in the file of this patent
UNITED STATES PATENTS

| | | |
|---|---|---|
| 2,951,082 | Sprague et al. | Aug. 30, 1960 |
| 2,973,354 | Werner | Feb. 28, 1961 |
| 3,074,931 | Craig | Jan. 22, 1963 |
| 3,084,155 | Winthrop et al. | Apr. 2, 1963 |

FOREIGN PATENTS

| | | |
|---|---|---|
| 345,011 | Switzerland | Apr. 29, 1960 |

OTHER REFERENCES

Kranzlein: Berichte, vol. 70, pp. 1952–56 (1937).
Caronna et al.: Gazz. Chim. ital., vol. 84, pp. 1135–40 (1954).